United States Patent
Trajlinek et al.

(10) Patent No.: US 9,534,764 B2
(45) Date of Patent: Jan. 3, 2017

(54) ILLUMINATED WINDSHIELD SYSTEM

(71) Applicant: Taylor Made Group, LLC, Gloversville, NY (US)

(72) Inventors: Michael Trajlinek, Johnstown, NY (US); Philip A. Oakes, Middle Grove, NY (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 0 days.

(21) Appl. No.: 14/668,325

(22) Filed: Mar. 25, 2015

(65) Prior Publication Data

US 2015/0276174 A1 Oct. 1, 2015

Related U.S. Application Data

(60) Provisional application No. 61/970,474, filed on Mar. 26, 2014.

(51) Int. Cl.

| | |
|---|---|
| *B60Q 1/00* | (2006.01) |
| *F21V 1/00* | (2006.01) |
| *F21V 7/00* | (2006.01) |
| *B63B 19/02* | (2006.01) |
| *B63B 45/04* | (2006.01) |
| *B60Q 1/26* | (2006.01) |
| *B60Q 3/02* | (2006.01) |
| *B60J 1/00* | (2006.01) |
| *B60J 1/08* | (2006.01) |
| *F21W 101/04* | (2006.01) |

(52) U.S. Cl.
CPC .............. *F21V 7/0091* (2013.01); *B60J 1/004* (2013.01); *B60J 1/08* (2013.01); *B60Q 1/268* (2013.01); *B60Q 3/0213* (2013.01); *B63B 19/02* (2013.01); *B63B 45/04* (2013.01); *F21S 4/28* (2016.01); *F21V 2200/20* (2015.01); *F21W 2101/04* (2013.01); *F21Y 2103/10* (2016.08); *F21Y 2115/10* (2016.08)

(58) Field of Classification Search
CPC .... F21V 7/0091; F21V 2200/20; B63B 19/02; B63B 45/04; B60Q 1/268; B60Q 3/0213; F21S 4/28; F21W 2101/04; F21Y 2103/003; F21Y 2103/10; F21Y 2115/10; B60J 1/004; B60J 1/08
USPC ....... 362/477, 487, 493, 511, 520, 521, 522; 40/546
See application file for complete search history.

(56) References Cited

U.S. PATENT DOCUMENTS

| | | |
|---|---|---|
| 6,453,841 B1 | 9/2002 | Shearer et al. |
| 6,895,885 B2 | 5/2005 | Shearer et al. |
| D505,909 S | 6/2005 | Erskine et al. |
| 7,565,878 B2 | 7/2009 | Shearer et al. |
| 7,591,231 B2 | 9/2009 | Shearer et al. |
| 2008/0278932 A1* | 11/2008 | Tress ............. A47B 97/00 362/133 |
| 2011/0113828 A1* | 5/2011 | Matsumoto ......... C03C 23/0025 65/33.2 |

(Continued)

*Primary Examiner* — Anh Mai
*Assistant Examiner* — Glenn Zimmerman
(74) *Attorney, Agent, or Firm* — Nixon & Vanderhye P.C.

(57) ABSTRACT

An illuminated windshield system includes a trim member with a channel for receiving a windshield, and a windshield mounted in the channel and having an edge. A light source is interposed between the channel of the trim member and the edge of the windshield. The light source is disposed facing the edge of the windshield.

13 Claims, 2 Drawing Sheets

(56) References Cited

U.S. PATENT DOCUMENTS

| | | | | |
|---|---|---|---|---|
| 2013/0026461 A1* | 1/2013 | Nakamura | ............ | H01L 51/5268 257/40 |
| 2013/0307420 A1* | 11/2013 | Yoder | ................... | F21V 33/006 315/158 |
| 2014/0153274 A1* | 6/2014 | Shibata | ................ | B60Q 1/0683 362/520 |
| 2015/0131315 A1* | 5/2015 | Chang | ................. | G02B 6/0031 362/609 |

* cited by examiner

ILLUMINATED WINDSHIELD SYSTEM

CROSS-REFERENCES TO RELATED APPLICATIONS

This application claims the benefit of U.S. Provisional Patent Application No. 61/970,474, filed Mar. 26, 2014, the entire content of which is herein incorporated by reference.

STATEMENT REGARDING FEDERALLY SPONSORED RESEARCH OR DEVELOPMENT (NOT APPLICABLE)

BACKGROUND AND SUMMARY OF THE INVENTION

The invention relates to illuminated glass systems and, more particularly, to an illuminated windshield system cooperable with a windshield secured in a trim member.

The illuminated windshield system according to preferred embodiments includes a light source that is placed on and follows along the edge of a glass component. The system is applicable to any glass type, for example, glass doors, hatches, windshields, and roof systems in industries such as marine, agriculture, power sport, and others. Reference to "windshield" in the present application is intended to refer generically to any glass panel to which the system may be applied.

The light shines into the glass in such a way to allow the glass to have complete or partial internal reflection of light. The light travels internally through the glass until it is redirected by interactions with a finished edge, a painted frit pattern, etching, film or some other form of disruption. In these areas, the light is redirected out of the glass, resulting in a lighted or glowing pattern that is visible on one or both sides of the glass.

In an exemplary embodiment, an illuminated windshield system includes a trim member with a channel for receiving a windshield, and a windshield mounted in the channel and having an edge. A light source is interposed between the channel of the trim member and the edge of the windshield. The light source is disposed facing the edge of the windshield.

The light source may include a light strip with a plurality of lights, where the lights are disposed facing the edge of the windshield. In this context, the light strip may be disposed along an entire length of the edge. The system may additionally include a gasket disposed in the channel between the channel and the windshield, where the light source is disposed between the gasket and the windshield.

The windshield may include a disruption that disrupts internal reflectivity of the windshield. The disruption may be a frit pattern or an etching that is illuminated when the light source is on.

In one embodiment, the light source includes an LED light box.

The system may further include a top trim member with a top channel for receiving the windshield, where the light source is interposed between the top channel and the top edge of the windshield.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
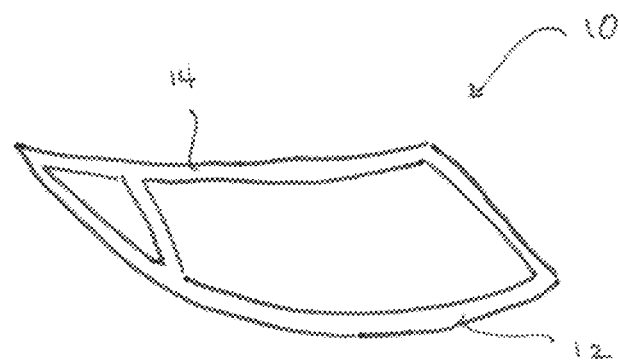
FIG. 1 is a perspective view of a boat windshield as one exemplary application of the illuminated windshield system according to the described embodiments.

FIG. 1 is a perspective view of a boat windshield 10 as an exemplary application for the illuminated windshield system of the preferred embodiments. As noted, the use of the term "windshield" in the present application is intended to encompass any glass panel to which the components of the system can be attached. Other exemplary applications may include glass doors, hatches and roof systems.

Generally, a boat windshield 10 may include a bottom trim member 12 that is secured to a boat hull or the like and possibly also a top trim member 14. Any suitable bottom or top trim members may be used with the system described herein, and the invention is not intended to be limited to any particular trim design. Exemplary trim members are described in U.S. Pat. Nos. 6,453,841, 6,895,885, D505,909, 7,565,878 and 7,591,231, the disclosures of which are hereby incorporated by reference.

Figure 2:
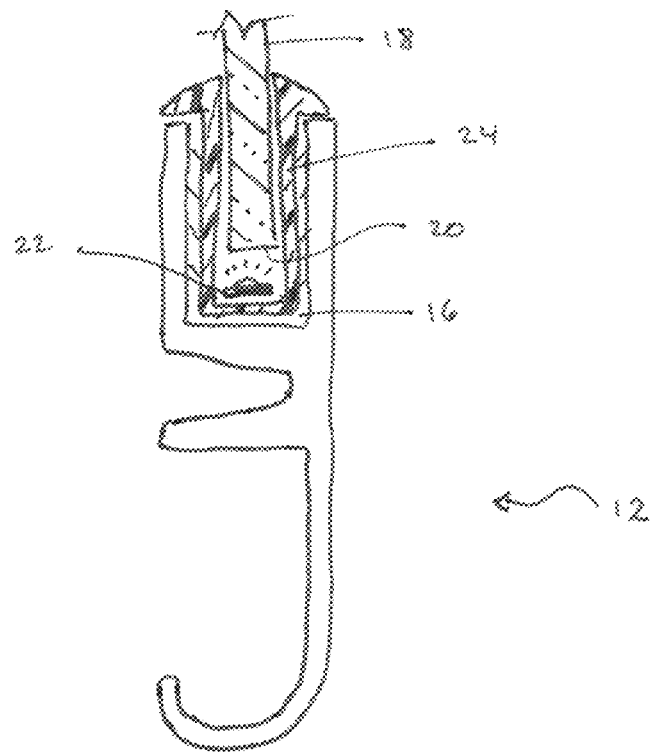
FIG. 2 is a sectional view of the illuminated windshield system including a bottom trim member.

FIG. 2 is a sectional view of the illuminated windshield system with the bottom trim member 12. The trim member 12 includes a bottom channel 16 for receiving a windshield 18. The windshield 18 is mounted in the bottom channel 16 and includes a bottom edge 20. A light source 22 is interposed between the bottom channel 16 and the bottom edge 20 of the windshield 18. The light source 22 is disposed facing the bottom edge 20 of the windshield 18. Preferably, the light source 22 is a light strip including a plurality of lights facing the edge 20 of the windshield 18. An exemplary light strip is the "Astra" Flexible LED Tape Lights available from ITC Incorporated of Holland, Mich. The light strip is preferably disposed along an entire length of the bottom edge 20. A gasket 24 may be disposed in the bottom channel 16 between the bottom channel 16 and the windshield 18. In this context, the light source 22 is disposed between the gasket 24 and the windshield 18.

Figure 3:
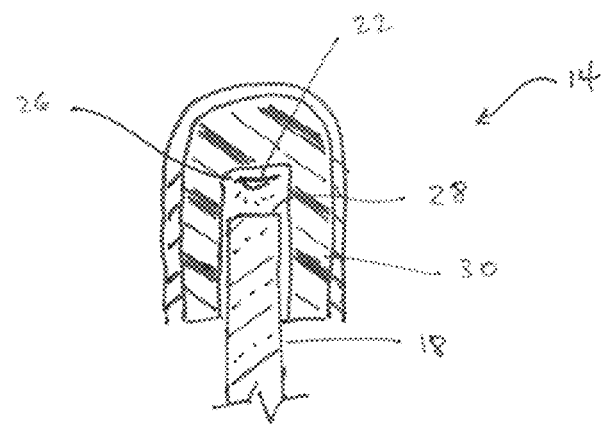
FIG. 3 is a sectional view of the illuminated windshield system including a top trim member.

FIG. 3 is a sectional view of an exemplary top trim 14. The top trim 14 includes a top channel 26 for receiving the windshield 18. A light source 22 is interposed between the top channel 26 and a top edge 28 of the windshield 18. The top trim may also include a gasket 30, in which case the light source 22 is interposed between the gasket 30 and the windshield 18.

In an alternative construction, the light source may also be integrated with a gasket or a plastic coating or housing. The integrated structure may be mounted on the windshield edge without a conventional trim member.

Figure 4:
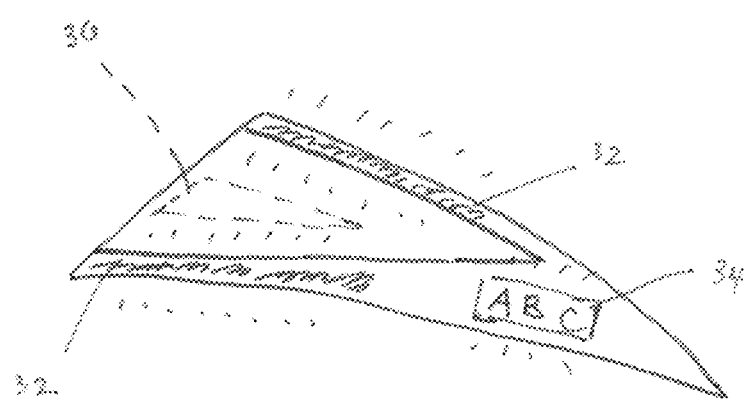
FIG. 4 shows a section of a windshield including an illuminated frit pattern and an illuminated etching.

With reference to FIG. 4, at least a portion of the windshield may be provided with a disruption that disrupts internal reflectivity of the windshield. For example, the disruption may be a frit pattern 32 that is illuminated when the light source is on. Alternatively or additionally, the disruption may include an etching 34 for a logo or the like or a film that is similarly illuminated when the light source is on. A finished edge may also provide the disruption to create the lighting effect. That is, with the light source disposed facing an edge of the glass, light travels internally through the glass until it is redirected by interactions with the disruption. In these areas, the light is redirected out of the glass resulting in a lighted or glowing pattern that is visible on one or both sides of glass or on the finished edge.

Other exemplary light sources may include an LED light box 36 (shown schematically in FIG. 4), electroluminescence, fiber optics, and the like.

An illuminated glass system provides increased visibility of the product or features of the product to which the system is applied as well as emergency/warning and/or navigation lighting. Additional benefits may include unique ambient lighting, console and/or componentry lighting and courtesy lighting.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An illuminated windshield system comprising:
   a trim member including a channel;
   a windshield mounted in the channel and having an edge;
   a light source interposed between the channel of the trim member and the edge of the windshield, wherein the light source is disposed facing the edge of the windshield; and
   a U-shaped gasket disposed in the channel between the channel and the windshield, the U-shaped gasket including sidewalls and a bottom wall that define the U-shape, wherein the sidewalls extend along inside surfaces of the channel and along the windshield, and wherein the light source is disposed adjacent the bottom wall between the gasket and the windshield.

2. The illuminated windshield system according to claim 1, wherein the light source comprises a light strip including a plurality of lights, the lights being disposed facing the edge of the windshield.

3. The illuminated windshield system according to claim 1, wherein the windshield comprises a disruption that disrupts internal reflectivity of the windshield.

4. The illuminated windshield system according to claim 1, wherein the light source comprises an LED light box.

5. The illuminated windshield system according to claim 1, wherein the windshield edge is a top edge, and wherein the trim member comprises a top trim member including a top channel for receiving the windshield, wherein the light source is interposed between the top channel and the top edge of the windshield.

6. The illuminated windshield system according to claim 1, wherein the windshield edge is a bottom edge, and wherein the trim member comprises a bottom trim member including a bottom channel for receiving the windshield, wherein the light source is interposed between the bottom channel and the bottom edge of the windshield.

7. The illuminated windshield according to claim 2, wherein the light strip is disposed along an entire length of the edge.

8. The illuminated windshield system according to claim 3, wherein the disruption comprises a frit pattern that is illuminated when the light source is on.

9. The illuminated windshield system according to claim 3, wherein the disruption comprises an etching that is illuminated when the light source is on.

10. The illuminated windshield system according to claim 6, wherein the disruption comprises a frit pattern that is illuminated when the light strip is on.

11. The illuminated windshield system according to claim 6, wherein the disruption comprises an etching that is illuminated when the light strip is on.

12. An illuminated windshield system comprising:
    a trim member including a channel;
    a windshield mounted in the channel and having an edge, wherein the windshield comprises a disruption that disrupts internal reflectivity of the windshield;
    a light strip interposed between the channel of the trim member and the edge of the windshield, wherein the light strip is disposed along a length of the edge and includes a plurality of lights disposed facing the edge of the windshield; and
    a U-shaped gasket disposed in the channel between the channel and the windshield, the U-shaped gasket including sidewalls and a bottom wall that define the U-shape, wherein the sidewalls extend along inside surfaces of the channel and along the windshield, and wherein the light strip is disposed adjacent the bottom wall between the gasket and the windshield.

13. The illuminated windshield system according to claim 12, wherein the trim member is one of a top trim and a bottom trim.

* * * * *